United States Patent [19]
Mauldin et al.

[11] Patent Number: 5,664,227
[45] Date of Patent: Sep. 2, 1997

[54] SYSTEM AND METHOD FOR SKIMMING DIGITAL AUDIO/VIDEO DATA

[75] Inventors: Michael L. Mauldin, Penn Hills; Michael A. Smith, Pittsburgh; Scott M. Stevens, Pittsburgh; Howard D. Wactlar, Pittsburgh; Michael G. Christel, Wexford; D. Raj Reddy, Pittsburgh, all of Pa.

[73] Assignee: Carnegie Mellon University, Pittsburgh, Pa.

[21] Appl. No.: 324,079

[22] Filed: Oct. 14, 1994

[51] Int. Cl.⁶ ........................................ G06F 19/00
[52] U.S. Cl. ........................................ 395/778; 395/807
[58] Field of Search .................. 364/419.13, 419.19; 360/14.3, 72.2; 395/778, 793, 807

[56] References Cited

U.S. PATENT DOCUMENTS

| | | | |
|---|---|---|---|
| 5,012,334 | 4/1991 | Etra | 358/311 |
| 5,136,655 | 8/1992 | Bronson | 381/41 |
| 5,172,281 | 12/1992 | Ardis et al. | 360/72.2 |
| 5,388,197 | 2/1995 | Rayner | 395/154 |
| 5,467,288 | 11/1995 | Fasciano et al. | 364/514 R |
| 5,521,841 | 5/1996 | Arman et al. | 395/154 |

FOREIGN PATENT DOCUMENTS

WO93/21588  10/1993  WIPO.

OTHER PUBLICATIONS

Xuedong Huang, et al., "The SPHINX–II speech recognition system: an overview" *Computer Speech and Language*, No. 2, 1993, pp. 137–148.

Scott M. Stevens, "Next Generation Network and Operating System Requirements for Continuous time Media," *Springer-Verlag*, 1992, pp. 197–208.

Yihong Gong, et al., "An Image Database System with Content Capturing and Fast Image Indexing Abilities," *Presidings of the First Intl. Conference on Multimedia Computing and Systems*, 1994, pp. 121–130.

Yoshinobu Tonomura, et al., "Structured Video Computing," *IEEE Multimeida*, Fall 1994, pp. 34–43.

Scott Stevens et al., *Informedia–Improving Access to Digital Video*, Oct., 1994, pp. 67–71, Interactions.

HongJiang Zhang et al., A Video Database System for Digital Libraries, pp. 253–264, Digital Libraries, Digital Libraries Workshop DL '94, Newark, NJ.

Ron MacNeil, Generating Multimedia Presentations Automatically using TYRO, the Constraint, Case–Based Designer's Apprentice, Oct. 8–11, 1991, pp. 74–79, 1991 IEEE Workshop on Visual Languages, Kobe, Japan.

Scott M. Stevens, *Next Generation Network and Operating System Requirements for Continuous Time Media*, Nov., 1991, pp. 198–208, Network and Operating System Support for Digital Audio and Video, Second International Workshop, Heidelberg, Germany.

*Primary Examiner*—Donald E. McElheny, Jr.
*Attorney, Agent, or Firm*—Kirkpatrick & Lockhart LLP

[57] ABSTRACT

A method for skimming digital audio and video data, wherein the video data is partitioned into video segments and the audio data has been transcribed, is comprised of the steps of selecting representative frames from each of the video segments. The representative frames are combined to form an assembled video sequence. Keywords contained in the corresponding transcribed audio data are identified and extracted. The extracted keywords are assembled into an audio track. The assembled video sequence and audio track are output together. An apparatus for carrying out the disclosed method is also disclosed.

18 Claims, 4 Drawing Sheets

SYSTEM AND METHOD FOR SKIMMING DIGITAL AUDIO/VIDEO DATA

STATEMENT REGARDING FEDERALLY FUNDED RESEARCH

The invention disclosed herein was made or conceived in the course of or under a contract with the United States Government.

BACKGROUND OF THE INVENTION

1. Field of the Invention

The present invention is directed generally to a system and method for skimming digital audio-video data, and more particularly, to a system and method for independently skimming digital audio and digital video data based on the information content of that audio-video data.

2. Related Application

This application is related to a U.S. patent application entitled "Method and Apparatus for Creating A Searchable Digital Video Library and A System and Method of Using Such a Library" by Wactlar et al., which is the "Wactlar et al. Application", filed concurrently herewith, and which is hereby incorporated by reference. The Wactlar et al. application and the instant application are commonly owned. The Wactlar et al. application is directed to the creation of a video digital library system wherein voice, images, and text are integrated to form an indexed searchable digital audio-video library. The Wactlar et al. application discloses a system for exploring the searchable digital audio-video library. The present invention described herein maybe used in conjunction with the apparatus and methods disclosed in the Wactlar et al. application. However, as will be appreciated by those skilled in the art, the present invention may be utilized with respect to any digital video or audio database.

DESCRIPTION OF THE BACKGROUND OF THE INVENTION

When the modality of communication has intrinsic temporal rates associated therewith, such as audio or video, searching becomes increasingly difficult. For example, it takes 1000 hours to review 1000 hours of video. Detailed indexing of the video can aid that process. However, users often wish to peruse video similar to the manner in which they flip through pages of a book. Unfortunately, mechanisms for doing so today are inadequate. Scanning by jumping a set number of frames may skip the target information completely. Conversely, accelerating the playback of motion video to twenty (20) times the normal rate presents information at an incomprehensible speed. Even if users could comprehend such accelerated playback, it would still take six minutes to scan two hours of videotape. A two second scene would be presented in only one-tenth of a second.

Similar to the problems with searching video, there is an analogous problem with searching audio, only more acute. Playing audio fast during a scan is impractical. Beyond one and one-half (1.5) to two (2) times the normal rate, audio becomes incomprehensible because the faster playback rates shift frequencies to the inaudible ranges. While digital signal processing techniques are helpful to reduce frequency shifts, at high playback rates, those digital signal processing techniques present sound bytes much like those of an analog videodisc scan.

As one can imagine, the problem is more complicated in a multimedia scenario. The integration of text, audio, and video thus presents many obstacles which must be overcome. There are about one hundred fifty (150) spoken words per minute of an average interview video. That translates to about nine thousand (9000) words for a one hour video, or roughly fifteen pages of text. A person skimming the text may be able to find relevant sections relatively quickly. However, if one was to search for a specific topic contained in a videotaped lecture, the searching problem is acute. Even if a high playback rate of three (3) to four (4) times normal speed was comprehensible, continuous play of audio and video is a totally unacceptable search mechanism. Assuming the target information was half-way through a one hour video file, it would still take approximately seven (7) to ten (10) minutes to find.

In complex, emerging fields such as digital libraries and multimedia, it is not surprising that most of today's applications have failed to take full advantage of the information bandwidth much less the capabilities of a multimedia, digital video and audio environment. Today's designs typically employ a VCR/Video-Phone view of multimedia. In this simplistic model, video and audio can be played, stopped, their windows positioned on the screen, and, possibly, manipulated in other ways such as by displaying a graphic synchronized to a temporal point in the multimedia object. This is the traditional analog interactive video paradigm developed almost two decades ago. Rather than interactive video, a much more appropriate term for this is "interrupted video."

Today's interrupted video paradigm views multimedia objects more as text with a temporal dimension. Differences between motion video and other media, such as text and still images, are attributed to the fact that time is a parameter of video and audio. However, in the hands of a user, every medium has a temporal nature. It takes time to read (process) a text document or a still image. In traditional media each user absorbs the information at his or her own rate. One may even assimilate visual information holistically, that is, come to an understanding of complex information nearly at once.

However, to convey almost any meaning at all, video and audio must be played at a constant rate, the rate at which they were recorded. While, a user might accept video and audio played back at 1.5 times normal speed for a brief time, it is unlikely that users would accept long periods at such playback rates. In fact, studies show that there is a surprisingly significant sensitivity to altering playback fidelity. Even if users did accept accelerated playback, the information transfer rate would still be principally controlled by the system.

While video and audio data types are constant rate, continuous-time, the information contained in them is not. In fact, the granularity of the information content is such that a one-half hour video may easily have one hundred semantically separate chunks. The chunks may be linguistic or visual in nature. They may range from sentences to paragraphs and from images to scenes.

Understanding the information contained in video is essential to successfully implementing the digital video library system of the Wactlar et al. Application. Returning a full one-half hour video when only one minute is relevant is much worse than returning a complete book, when only one chapter is needed. With a book, electronic or paper, tables of contents, indices, skimming, and reading rates permit users to quickly find the chunks they need. Since the time to scan a video cannot be dramatically shorter than the real time of the video, a digital video library must give users just the material they need. Understanding the information content of video enables not only finding the relevant material but presenting that information in useful forms.

Tools have been created to facilitate audio browsing which present graphical representations of the audio waveform to the user to aid identification of locations of interest. However, studies have shown that those techniques are useful only for audio segments under three minutes in duration.

Accordingly, the need exists for a tool adaptable to a multimedia environment for skimming digital audio and video data. Such a tool should be based on content of the digital video data instead of being based merely on image statistics. Moreover, the skimming rate must be such as to account for different information content of video segments. Finally, the video and audio searches should be independent with respect to each other to improve information content of the skim.

SUMMARY OF THE PRESENT INVENTION

The present invention is directed to a system and method for skimming digital audio/video data wherein said video data is partitioned into video segments. The method includes selecting representative frames from each of the video segments, combining the representative frames to form a compressed video sequence, transcribing the audio data, identifying keywords contained in the transcribed audio data, selecting portions of the audio data identified as keywords in the identifying step to form a compressed audio track, and playing the compressed video sequence in conjunction with the compressed audio track.

Accordingly, it is an object of the present invention to establish a system whereby digital audio-video libraries may be easily skimmed based on content of the audio and video data. It is a further object of the invention that the playback rate, and thus the information content, of audio and video data from a digital library be controllable by a user. It is a further object of the invention that digital video data and transcriptions of audio data be independently searched and skimmed. It is yet another feature that the most important video segments and the most important audio segments are selected for the skim.

It is an advantage of the present invention that content-based video images are presented to the user. It is a further advantage that audio key words and phrases, independent of the video image skim, are presented to the user. It is another advantage of the present invention that textual keywords are identified and can be presented along with video or still images. It is another advantage of the present invention that a reduction of time of up to twenty (20) times or more is achieved while retaining most information content. Those and other advantages and benefits will become apparent from the Detailed Description of the Preferred Embodiment hereinbelow.

BRIEF DESCRIPTION OF THE DRAWINGS

The various objects, advantages, and novel features of the present invention will be described, by way of example only, in the following detailed description, when read in conjunction with the appended drawings, in which.

DETAILED DESCRIPTION OF THE PREFERRED EMBODIMENT

Figure 1:
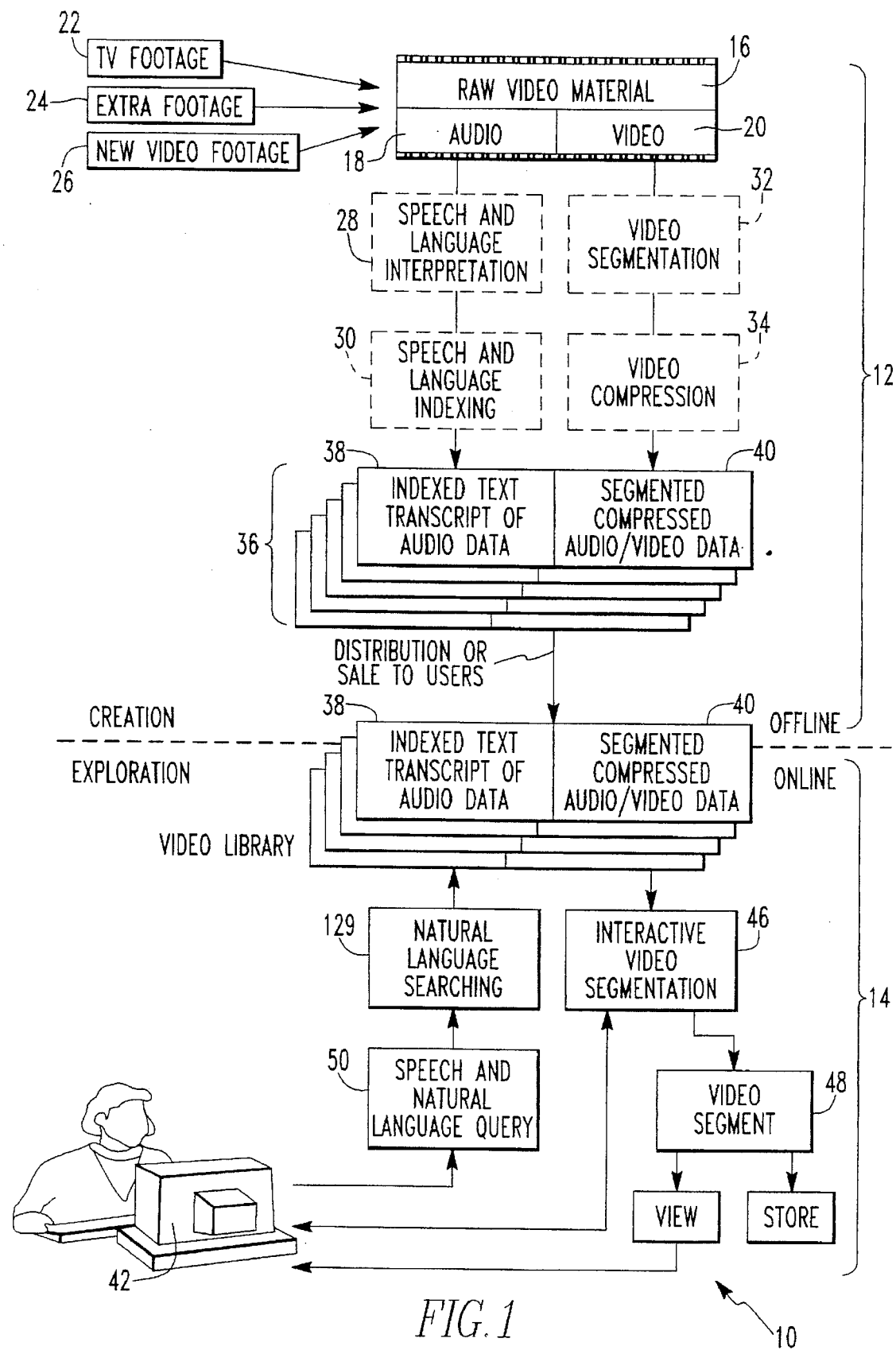
FIG. 1 is block diagram illustrating an overview of the on-line and off-line processing of information in a digital video library system with which the present invention may be used.

With reference to FIG. 1, there is shown an overview of a digital video library system, generally referred to by the numeral 10, constructed according to the teachings of the Wactlar et al. application. Like reference numerals will be used among the various figures to denote like elements. In FIG. 1, the digital video library system 10 is shown to have two portions 12, 14. The offline portion 12 involves the creation of a digital library 36. The online portion 14 includes the functions used in the exploration of the video digital library 36. As used herein, the term digital video library system 10 refers to the entire system, while the term digital library refers to the database created by the offline portion 14. It will be understood by those skilled in the art that while the present invention will be described in conjunction with the video digital library system 10 described herein, the system and method of the present invention are adaptable to any type of digital video and digital audio system.

The offline portion 12 receives raw video material 16 comprising audio data 18 and video data 20. The raw video material 16 may include audio-video from any one or a number of various sources. It is preferable that the raw video material 16 incorporates not only television footage 22, but also the unedited source materials, shown generally as extra footage 24, from which the television footage 22 was derived. Such extra footage 24 enriches the digital video library 36 significantly such that the raw video material 16 may be used as reference resources and for uses other than those originally intended. The extra footage 24 also enlarges the amount of raw video material 16 significantly. For example, typical source footage runs fifty (50) to one hundred (100) times longer than the corresponding broadcast television footage 22. Obviously, new video footage 26 not created for broadcast television may also be included.

Raw material may also include pure text, audio only, or video only.

The audio data 18 is subjected to the functions of speech and language interpretation 28 and speech and language indexing 30, each of which will be described in conjunction with the skimming function described herein. The video data 20 is subjected to the functions of video segmentation 32 and video compression 34. The resultant indexed video library 36 includes indexed, text transcripts of audio data 38 indexed, transcribed audio data, and segmented, compressed, audio video data 40. The digital library also includes indexed text and segmented compressed audio data. The digital library 36 is the output of the offline portion 12 of the digital video library 10. It is the video library 36 which is used by the online portion 14 and which, in a commercial environment, is accessed or otherwise made available to users.

Turning now to the online portion 14 of the digital video library system 10, the video digital library database 36 is made available to a user workstation 42. The workstation 42 preferably recognizes both voice commands and textual natural language queries, either of which will invoke a natural language search function 129. Through an interactive video segmentation function 46, video segments 48 are retrieved. The video segments 48 may be viewed at the workstation 42 and selectively stored for future use.

No matter how precise the selection of video segments 48, the ability to skim through video and/or audio is desired and provided by the present invention. Video segmentation 32 is used in the skimming process. By creating video paragraphs on scene boundaries, a high speed scan of digital video files by presenting quick representations of scenes is provided.

Figure 2:
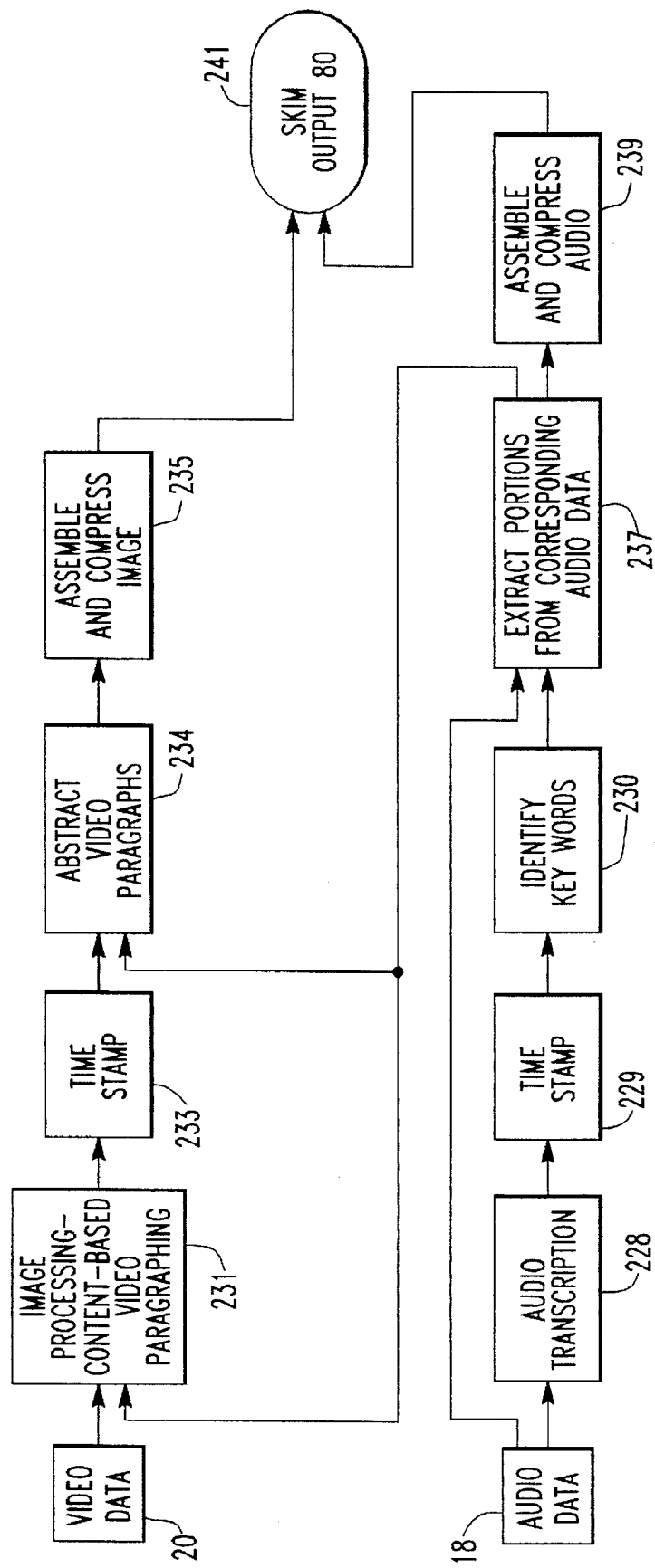
FIG. 2 is a flow diagram illustrating the process of generating a digital video skim.

With reference to FIG. 2, there is shown a process flow for the creation of the skim output 80. The video data 20 is input into an image processing function, represented by block 231. The image processing function 231 generally includes digitization of the video data 20 using techniques known in the art and then segmenting that digitized video data into paragraphs based on content. See Wactlar et al. Content based paragraphing avoids the time-consuming, conventional procedure of reviewing a video file frame-by-frame around an index entry point. To identify segment boundaries, the image processing function 231 locates beginning and end points for each shot, scene, conversation, or the like by applying machine vision methods that interpret image sequences.

We prefer, however, to use content-based video paragraphing methods because the ultimate user is interested in content or subject retrieval, not simply image retrieval. The subject of video consists of both image content, textual content, and text transcripts of audio, the combination of which specifies the subject. The textual information attached is useful to quickly filter video segments locating potential items of interest. A subsequent visual query, referring to image content, is preferred. For example, queries such as "Find video with similar scenery," "Find the same scene with different camera motion," and "Find video with the same person," are important considerations from a user's perspective. Part of those queries may be realized by content-independent methods, such as histogram comparisons.

Current efforts in image databases, in fact, are mostly based on indirect image statistics methods. They fail to exploit language information associated with images or to deal with three dimensional events.

We use multiple methods, either separately or in combination, for the paragraphing function. The first method is the use of comprehensive image statistics for segmentation and indexing. This initial segmentation can be performed by monitoring coding coefficients, such as Discrete Cosine Transform ("DCT"), and detecting fast changes in them. This analysis also allows for identifying the key frame(s) of each video paragraph; the key frame is usually at the beginning of the visual sentence and is relatively static.

Once a video paragraph is identified, we extract image features such as color and shape and define those as attributes. A comprehensive set of image statistics such as color histograms and Kalman filtering (edge detection) is created. While these are "indirect statistics" to image content, they have been proven to be useful in quickly comparing and categorizing images, and will be used at the time of retrieval.

We prefer the concurrent use of image, speech and natural language information. In addition to image properties, other cues, such as speaker changes, timing of audio and/or background music, and changes in content of spoken words can be used for reliable segmentation.

The next integrated method to determine video paragraph boundaries is two-dimensional camera and object motion. With this method, visual segmentation is based on interpreting and following smooth camera motions such as zooming, panning, and forward camera motion. Examples include the surveying of a large panoramic scene, the focusing of a viewer's attention on a small area within a larger scene, or a moving camera mounted on a vehicle such as a boat or airplane.

A more important kind of video segment is defined not by motion of the camera, but by motion or action of the objects being viewed. For example, in an interview segment, once the interviewer or interviewee has been located by speech recognition, the user may desire to see the entire clip containing the interview with this same person. This can be done by looking forward or backward in the video sequence to locate the frame at which this person appeared or disappeared from the scene.

We also prefer to incorporate developing techniques to track high degree-of-freedom objects, such as a human hand (having twenty-seven (27) degrees of freedom), based on "deformable templates" and the Extended Kalman Filtering method. Such a technique provides a tool to the video database to track and classify motions of highly articulated objects.

Segmenting video by appearance of a particular object or a combination object, known by those skilled in the art as "object presence", is also a powerful tool and we prefer to include methods for doing so. While this is difficult for a general three-dimensional object for arbitrary location and orientation, the technique of the KL Transform has proven to work to detect a particular class of object. Among object presence, human content is the most important and common case of object presence detection.

Finally, the techniques discussed so far are applicable to two-dimensional scenes, but video represents mostly three-dimensional shape and motion. Adding a three-dimensional understanding capability to the paragraphing function greatly expands the abilities of the video segmentation function 32. The "factorization" approach, pioneered at Carnegie Mellon University, is used in our approach wherein in each image frame an "interest point" operator finds numerous corner points and other points in the image that lend themselves to unambiguous matching from frame to frame. All the coordinates of these interest points, in all frames of the video sequence, are put into a large array of data. Based on a linear algebra theory, it has been proven that this array—whose rank is always equal to or less than 3—can be decomposed into shape and motion information, i.e., Observations=Shape×Motion.

Other rules generated by the natural language interpretation function may be useful to content-based paragraphing. For example, keywords of "football" and "scoreboard" may be used to identify scenes in a football game segmented by the showing of the scoreboard.

Moreover, the present invention also provides the ability to segment based on time.

It will be understood by those skilled in the art that any of those methods may be employed in the paragraphing function, either separately or in combination with other methods, to meet the requirements of particular applications.

After time-stamping at step 233, each video paragraph may then be reasonably abstracted by a representative frame and thus be treated as a unit for context sizing or for an image content search. At least a portion of this task is done by content-independent statistical methods which detect image changes, for example, key frame detection by changes in the DCT coefficient. Alternatively, representative frames may be selected as those which correspond to the most important audio segment selected at step 237 and as described herein.

Figure 3:
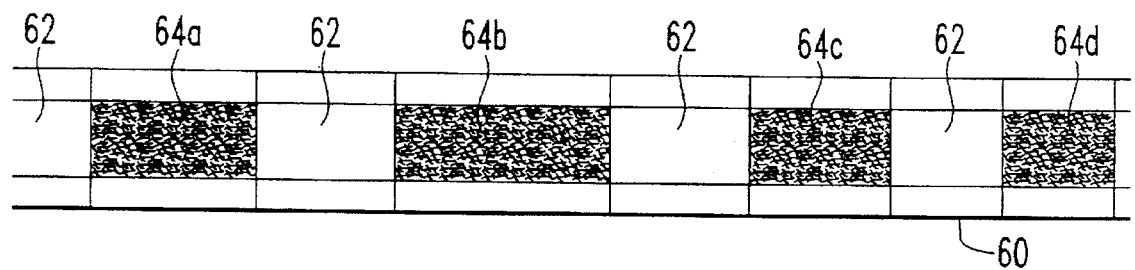
FIG. 3 is a schematic diagram showing frames of digital video in sequence with key frames highlighted.

With reference to FIG. 3, there is shown a series of video frames collectively referred to by the numeral 60. Clips 64a, 64b, 64c, and 64d are selected which are representative of each video paragraph. Each video paragraph is time stamped at step 233. The time stamp is used as an index back to the unedited video and may also be used for loose correlation with the audio portion of the skimming function.

Figure 4:
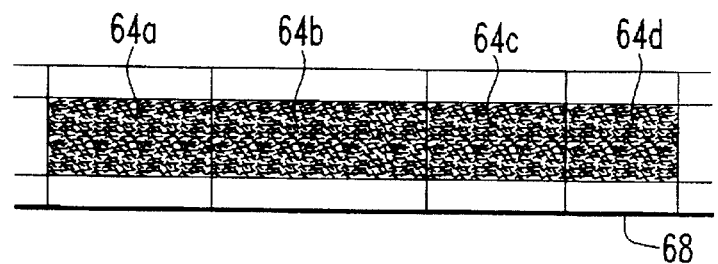
FIG. 4 is a schematic diagram showing frames of digital video wherein only the key frames identified in FIG. 3 are included.

Thereafter the representative clips 64a, 64b, 64c, and 64d are compressed and assembled at step 235. The step 235 removes the nonrepresentative frames 62 from the series of video frames 60 to create a skimmed video 68 as shown in FIG. 4. The skimmed video 68 comprises the representative frames 64a, 64b, 64c, and 64d.

Likewise, the audio data 18 is processed to derive the audio portion of the skim output 241. Referring to FIG. 2, audio data 18 is transcribed by the audio transcription function 228. The audio transcription function may be performed in any manner known in the art and may, for example, be performed by the Sphinx-II program as described in Wactlar et al. Other known methods include, but are not limited to, transcription and close captioning techniques. Once the audio data 18 is transcribed, it is time-stamped at step 229.

At step 230, keywords are identified in the transcribed audio data 18. We prefer that natural language processing techniques be used to determine keywords.

Another function of the natural language processing may be defined as "tagging" wherein using data extraction techniques known in the art, the names of people, places, companies, organizations and other entities mentioned in the sound track may be determined. This will allow the user to find all references to a particular entity with a single query. Such tagged information may be used to identify keywords for audio skim production.

Our natural language processing functions applied at steps 129 and 230 are based on known techniques and may, for example, apply statistical techniques or expert systems. Natural language processing is described in Mauldin, *Conceptual Information Retrieval*, Kluwer Academic Publishers, 1991, ISBN 0-7923-9214-0, which is hereby incorporated herein by reference. For example, a natural language interpreting function is embodied in the Scout system developed at Carnegie Mellon University. Other natural language interpreters or processors are known in the art and may be employed therefor. The Scout system is a full-text information storage and retrieval system that also serves as a testbed for information retrieval and data extraction technology. The natural language interpretation function may also be applied to the transcripts generated by the audio transcription function 238 and time stamping function 229 to identify keywords at step 530. Because processing at this point occurs offline, the natural language interpretation function 230 has the advantage of more processing time which fosters understanding and allows the correction of transcription errors.

Continuing with reference to FIG. 2, a term weighting process, such as Term Frequency-Inverse Document Frequency ("TF-IDF"), is used for keyword identification 230. The TF-IDF process accumulates statistics relating to term frequency as stated above. These term weights may be modified according to an original user query 50 to customize the keyword selection for the user's context. Those identified keywords are used to extract the most relevant portions of the audio 18 at step 237.

The TF-IDF process assigns weights to particular terms based on the frequency which those terms appear in a short segment i.e., audio corresponding to a video paragraph, in relation to the frequency those terms appear in an entire transcript. As will be appreciated by those skilled in the art, TF-IDF is a standard technique in information retrieval and information theory to determine the relative importance of a word.

Figure 5:
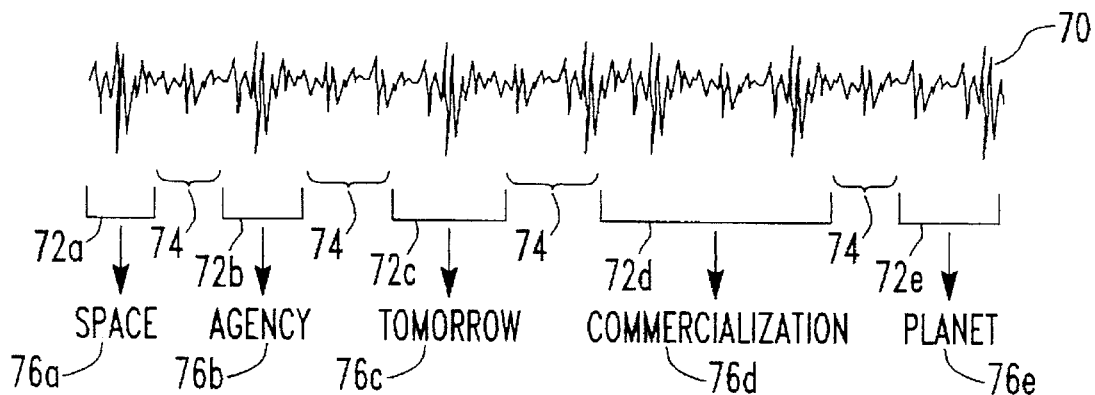
FIG. 5 is a schematic diagram showing transcriptions of audio data with key words highlighted.
Figure 6:
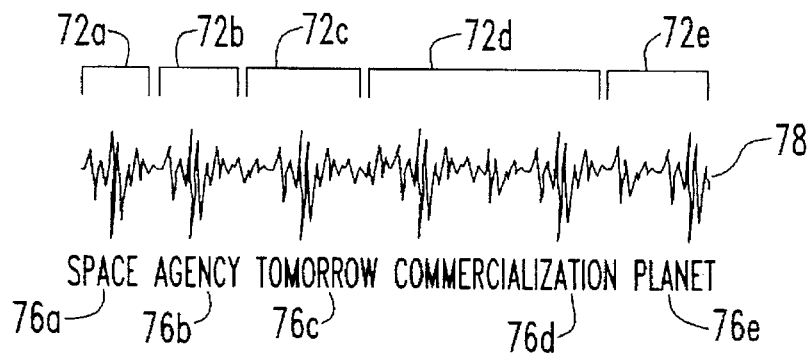
FIG. 6 is a schematic diagram showing transcriptions wherein only the key words of the audio data in FIG. 5 are included.

At step 239, the audio is assembled and compressed. It will be understood by those skilled in the art that the compression may be performed before or after keyword identification 230. With reference to FIGS. 5 and 6, key words from step 237 included in the audio track 70 are identified and represented by numerals 76a, 76b, 76c, 76d and 76e. The digitized audio transcripts for each of these keywords are identified by segments 72a, 72b, 72c, 72d, and 72e, respectively. Nonkeyword segments are identified by segments 74.

The audio assembly and compression function 239 uses the time stamp of each keyword to 76a, 76b, 76c, 76d, and 76e to retrieve audio data on either side of each keyword 76a, 76b, 76c, 76d, and 76e and order that retrieved audio data. The resultant audio track 78 comprising the keywords is shown in FIG. 6.

Figure 7:
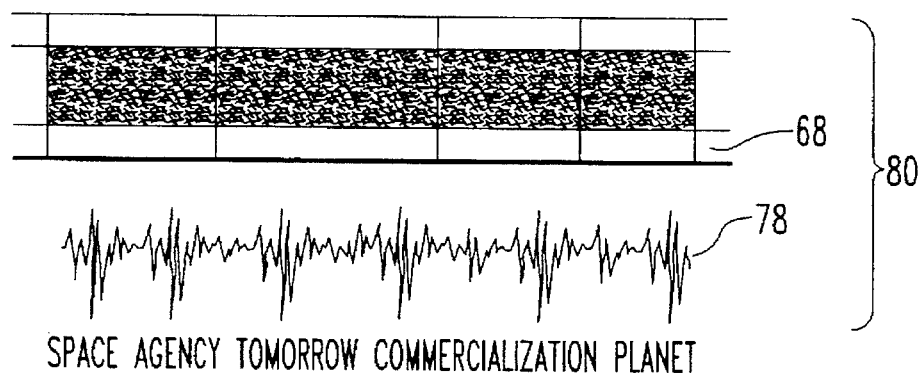
FIG. 7 is a schematic diagram showing the schematic diagrams of FIGS. 4 and 6 and the relationship therebetween.

The video sequences 68 and audio track 78 are combined at step 241 to produce the skim output 80 as shown in FIG. 7. To improve the overall information content of the skim output 80, the video sequences 68 and audio track 78 are selected so as to correspond to one another but during playback the video sequences and audio track 78 are not necessarily synchronized in their original form.

We have found that the skim output 80 will work to speed up playback of rates up to twenty (20) times. Because we track the most significant pieces, a skim may be produced at any desired length. It should be noted that the information content, which determines the comprehensibility of the skim, is a function of the desired speed.

To control the speed up we have created a simulated slide switch, or alternatively, an analog rotary dial or other interface means. The slide switch interactively controls the rate of playback of a given retrieved segment, at the expense of both informational and perceptual quality. The user typically selects a playback rate and the skim output 80 is created based on the selection. Slower playback rates result in more comprehensive skims while the information content is less for skims using higher playback rates. One could also set this dial to skim by content, e.g., visual scene changes. Video segmentation will aid this process. By knowing where scenes begin and end, high speed scans of digital video segments 48 may be performed by presenting quick representations of scenes.

It will be understood that variations and changes in the details of the present invention as herein described and illustrated may be made by those skilled in the art without departing from the spirit, principle and scope of the present invention. Accordingly, it is expressly intended that all such equivalents, variations and changes therefrom which fall within the principle and scope of the present invention as described herein and defined in the claims be embraced thereby.

What is claimed is:

1. A method for skimming digital audio and video data wherein the video data is partitioned into video segments and the audio data has been transcribed, said method comprising:

selecting at least one representative frame from each of the video segments;

combining said representative frames to form an assembled video sequence;

identifying keywords contained in the transcribed audio data;

extracting those portions of the audio data identified as keywords;

assembling an audio track from said extracted audio data; and outputting said assembled video sequence in conjunction with said assembled audio track.

2. The method of claim 1 wherein said representative frames are selected using content-independent statistical methods which detect image changes.

3. The method of claim 1 wherein said representative frames are selected to correspond to certain of said extracted portions of the audio data.

4. The method of claim 1 wherein said keywords contained in the transcribed audio data are identified using natural language processing techniques.

5. The method of claim 4 wherein said natural language processing techniques are statistical techniques.

6. The method of claim 4 wherein said natural language processing techniques are expert systems.

7. The method of claim 1 wherein said keywords contained in the transcribed audio data are identified using a term weighting process.

8. The method of claim 1 further comprising the step of compressing said assembled audio track and said assembled video sequence before outputting said assembled video sequence in conjunction with said assembled audio track.

9. An apparatus for skimming digital audio and video data wherein the video data is partitioned into video segments and the audio data has been transcribed, said apparatus comprising:

means for selecting at least one representative frame from each of the video segments;

means for combining said representative frames to form an assembled video sequence;

means for identifying keywords contained in the transcribed audio data;

means for extracting those portions of the audio data identified as keywords;

means for assembling an audio track from said extracted audio data; and means for outputting said assembled video sequence in conjunction with said assembled audio track.

10. The apparatus of claim 9 wherein said means for selecting representative frames uses content-independent statistical methods which detect image changes.

11. The apparatus of claim 9 wherein said means for selecting representative frames selects said frames to correspond to certain of said extracted portions of the audio data.

12. The apparatus of claim 9 wherein said means for identifying said keywords contained in the transcribed audio data uses natural language processing techniques.

13. The apparatus of claim 12 wherein said natural language processing techniques are statistical techniques.

14. The apparatus of claim 12 wherein said natural language processing techniques are expert systems.

15. The apparatus of claim 9 wherein said means for identifying said keywords contained in the transcribed audio data uses a term weighting process.

16. The apparatus of claim 9 further comprising means for compressing said assembled audio track and said assembled video sequence before said means for outputting.

17. A method of preparing data, comprising the steps of:

partitioning video data into video segments based on content;

time stamping said video segments;

selecting at least one representative frame from each of the video segments;

combining said representative frames to form an assembled video sequence;

transcribing audio data;

time stamping said transcribed audio data;

identifying key words contained in said transcribed audio data;

extracting those portions of said audio data identified as key words; and assembling an audio track in response to said extracted audio data.

18. An apparatus for preparing data, comprising:

means for partitioning video data into video segments based on content;

means for time stamping said video segments;

means for selecting at least one representative frame from each of the video segments;

means for combining said representative frames to form an assembled video sequence;

means for transcribing audio data;

means for time stamping said transcribed audio data;

means for identifying key words contained in said transcribed audio data;

means for extracting those portions of said audio data identified as key words; and means for assembling an audio track in response to said extracted audio data.

* * * * *